United States Patent
Leal Herrera et al.

(10) Patent No.: US 11,995,994 B2
(45) Date of Patent: May 28, 2024

(54) METHOD AND SYSTEM FOR CONNECTING ONE OR MORE APPLICATIONS OF AN ELECTRONIC DEVICE TO ONE OR MORE AVIONICS SYSTEMS

(71) Applicant: GE AVIATION SYSTEMS LLC, Grand Rapids, MI (US)

(72) Inventors: Victor Mario Leal Herrera, Querétaro (MX); Joachim Karl Ulf Hochwarth, Caledonia, MI (US); MacKenzie Dylan Cumings, Wyoming, MI (US); Daniel Ross DeVette, Kentwood, MI (US)

(73) Assignee: GE Aviation Systems LLC, Grand Rapids, MI (US)

(*) Notice: Subject to any disclaimer, the term of this patent is extended or adjusted under 35 U.S.C. 154(b) by 623 days.

(21) Appl. No.: 17/148,060

(22) Filed: Jan. 13, 2021

(65) Prior Publication Data
US 2021/0225175 A1 Jul. 22, 2021

Related U.S. Application Data

(60) Provisional application No. 62/962,387, filed on Jan. 17, 2020.

(51) Int. Cl.
*G06F 8/60* (2018.01)
*B64D 45/00* (2006.01)
*G08G 5/00* (2006.01)

(52) U.S. Cl.
CPC .......... *G08G 5/0021* (2013.01); *B64D 45/00* (2013.01); *G06F 8/60* (2013.01); *G08G 5/0013* (2013.01); *G08G 5/003* (2013.01); *B64D 2045/0075* (2013.01)

(58) Field of Classification Search
None
See application file for complete search history.

(56) References Cited

U.S. PATENT DOCUMENTS

| | | | |
|---|---|---|---|
| 8,881,294 | B2 | 11/2014 | Johnson et al. |
| 9,124,580 | B1 | 9/2015 | Sampigethaya |
| 9,166,958 | B2 | 10/2015 | Ho et al. |
| 9,979,554 | B2 | 5/2018 | Watson |
| 10,074,282 | B1 | 9/2018 | Wilber |
| 10,319,240 | B2 | 6/2019 | Beernaert |
| 10,742,414 | B1 * | 8/2020 | Wieker ............... H04L 63/062 |
| 2018/0287787 | A1 | 10/2018 | Tschache et al. |
| 2019/0248504 | A1 * | 8/2019 | K ......................... B64D 45/00 |
| 2019/0311632 | A1 | 10/2019 | Hochwarth et al. |
| 2019/0327307 | A1 | 10/2019 | Watson et al. |
| 2020/0115066 | A1 * | 4/2020 | De Munck ............ G06N 20/00 |

FOREIGN PATENT DOCUMENTS

| | | |
|---|---|---|
| CN | 102844741 A | 12/2012 |
| CN | 104683142 A | 6/2015 |
| CN | 110312256 A | 10/2019 |

* cited by examiner

*Primary Examiner* — Craig C Dorais
(74) *Attorney, Agent, or Firm* — McGarry Bair PC (57) ABSTRACT

An electronic device for an aircraft. The electronic device comprising a memory associated with an Operating System (OS) and at least one application at least partially operable by way of the electronic device. The at least one application is further configured to establish a connection with at least one avionics system of an aircraft for receiving data from the at least one avionics system.

18 Claims, 6 Drawing Sheets

ABSTRACT: Loading image content...

METHOD AND SYSTEM FOR CONNECTING ONE OR MORE APPLICATIONS OF AN ELECTRONIC DEVICE TO ONE OR MORE AVIONICS SYSTEMS

CROSS REFERENCE TO RELATED APPLICATIONS

This application claims the benefit of U.S. Provisional Application No. 62/962,387, filed Jan. 17, 2020, which is incorporated herein by reference in its entirety.

TECHNICAL FIELD

This disclosure relates generally to connecting one or more applications of an electronic device to one or more avionics systems, and more specifically to connecting one or more applications on an Electronic Flight Bag (EFB) to an avionics system.

BACKGROUND

In an effort for airspace modernization, air traffic management is being modernized to leverage emerging technologies and aircraft navigation capabilities. Aircraft navigation can utilize high-accuracy Global Navigation Satellite Systems (GNSSs) (e.g., Global Positioning System (GPS) or Galileo) or, modern Flight Management Systems (FMSs) and Flight Control Systems (FCSs).

During flight operations, the flight crew can perform flight management tasks through use of an Electronic Flight Bag (EFB). The EFB can allow for flight crews to input, and automatically update or monitor information concerning the operation of the aircraft such as, but not limited to, the flight plan, weather conditions, flight delays, fuel status, route changes, operation manuals, surveillance, or accident/incident reports.

BRIEF DESCRIPTION

In one aspect, aspects of the disclosure relate to an electronic device for an aircraft, the electronic device comprising, a memory associated with an operating system (OS), specialized data key stored within the memory, and at least one application at least partially operable by way of the electronic device and operable in response to a request for data transmission wherein the at least one application is configured utilize the specialized data key for establishing a connection with at least one avionics system of the aircraft and for receiving data from the at least one avionics system.

In another aspect, aspects of the disclosure relate to an aircraft communication system comprising an electronic device having memory associated with an Operating System (OS) and at least one application, and at least one avionics system of the aircraft, configured receive data from the at least one application in response to authorizing the at least one application by way of a specialized data key wherein the specialized data key is stored in the memory associated with the OS, and wherein each of the at least one application is configured to request and receive the specialized data key from OS, enabling each of the at least one application to receive data from the at least one avionics system.

In another aspect, aspects of this disclosure relate to a method of authorizing an application of an electronic device to communicate with at least one avionics system, the method comprising initiating an authorization process between the electronic device and the one or more avionics system, receiving, in the electronic device, a specialized data key authorizing the receiving of data from the at least one avionics system, storing the specialized data key in memory associated with an operating system (OS), requesting, by the application of the electronic device, the specialized data key from the systems, and in response to being authorized by the avionics system,

DETAILED DESCRIPTION

Aspects of the disclosure described herein are directed toward a method of connecting one or more applications of an electronic device with one or more avionics systems. As used herein, the electronic device can be defined as any avionics or non-avionics device which can be configured to include one or more applications defined to be an avionic-specific application (e.g., an application which is used is in the operation of an aircraft). The electronic device can be further defined as a device which can connect to one or more avionics systems through an Avionics Interface Device (AID). For example, the electronic device can be an EFB. The EFB, or other electronic device, can include an Operating System (OS), in which one or more applications can query, obtain, or store a specialized data key. The specialized data key can enable, allow for, or otherwise provide for authorized data communication between the EFB or other electronic devices with the avionics system. For understanding, an EFB without the specialized data key is not enabled, or otherwise not "authorized" to exchange with, send to, or receive data communications from the avionics system. Further, the method disclosed herein allows for a mechanism for one or more applications to run within the AID or similar devices before complete authorization. As such, the specialized data key can be generated during runtime of the application.

Aspects of the disclosure can include data communications networks configured to operate according to defined network characteristics or specifications. For example, contemporary aircraft operate a set of components interconnected by way of a data network defined by a network standard, such as the ARINC-based standards, for example ARINC 429 (A429) specification, ARINC 664 (A664), Ethernet, or the like, which are incorporated herein in their entirety. Furthermore, while the aforementioned examples can include network topology examples, application level protocol standards, including but not limited to ARINC 834 (A834), or the like, can be included in their entirety. While aspects of the disclosure refer to the ARINC-based specifications, aspects of the disclosure are applicable to other specialized data networks, or the like utilized for data transmissions between a set of interconnected data sources and data destinations.

Furthermore, as used herein, the term "set" or a "set" of elements can be any number of elements, including only one. When referencing a "set" of data, it will be understood that the "set" of data can include no data, or null data. Also, as used herein, while sensors can be described as "sensing" or "measuring" a respective value, sensing or measuring can include determining a value indicative of or related to the respective value, rather than directly sensing or measuring the value itself. The sensed or measured values can further be provided to additional components. For instance, the value can be provided to a controller module or processor, and the controller module or processor can perform processing on the value to determine a representative value or an electrical characteristic representative of said value.

All directional references (e.g., radial, axial, upper, lower, upward, downward, left, right, lateral, front, back, top, bottom, above, below, vertical, horizontal, clockwise, counterclockwise) are only used for identification purposes to aid the reader's understanding of the disclosure, and do not create limitations, particularly as to the position, orientation, or use thereof. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. In non-limiting examples, connections or disconnections can be selectively configured to provide, enable, disable, or the like, an electrical connection or communicative connection between respective elements. Additionally, as used herein, "electrical connection" or "electrically coupled" can include a wired or wireless power or data (e.g., communicative or transmissive) connection between respective components.

Additionally, as used herein, a "controller" or "controller module" can include a component configured or adapted to provide instruction, control, operation, or any form of communication for operable components to affect the operation thereof. A controller module can include any known processor, microcontroller, or logic device, including, but not limited to: Field Programmable Gate Arrays (FPGA), an Application-Specific Integrated Circuit (ASIC), a Full Authority Digital Engine Control (FADEC), a Proportional controller (P), a Proportional Integral controller (PI), a Proportional Derivative controller (PD), a Proportional Integral Derivative controller (PID controller), a hardware-accelerated logic controller (e.g., for encoding, decoding, transcoding, etc.), the like, or a combination thereof. Non-limiting examples of a controller module can be configured or adapted to run, operate, or otherwise execute program code to affect operational or functional outcomes, including carrying out various methods, functionality, processing tasks, calculations, comparisons, sensing or measuring of values, or the like, to enable or achieve the technical operations or operations described herein. The operation or functional outcomes can be based on one or more inputs, stored data values, sensed or measured values, true or false indications, or the like.

While "program code" is described, non-limiting examples of operable or executable instruction sets can include routines, programs, objects, components, data structures, algorithms, etc., that have the technical effect of performing particular tasks or implement particular abstract data types. In another non-limiting example, a controller module can also include a data storage component accessible by the processor, including memory, whether transient volatile or non-transient, or Non-Volatile Memory (NVM). Additional non-limiting examples of the memory can include Random Access Memory (RAM), Read-Only Memory (ROM), flash memory, or one or more different types of portable electronic memory, such as discs, Digital Video Discs (DVDs), Compact Disc-ROMs (CD-ROMs), flash drives, Universal Serial Bus (USB) drives, the like, or any suitable combination of these types of memory. In one example, the program code can be stored within the memory in a machine-readable format accessible by the processor. Additionally, the memory can store various data, data types, sensed or measured data values, inputs, generated or processed data, or the like, accessible by the processor in providing instruction, control, or operation to affect a functional or operable outcome, as described herein.

In another non-limiting example, a control module can include comparing a first value with a second value, and operating or controlling operations of additional components based on the satisfying of that comparison. For example, when a sensed, measured, or provided value is compared with another value, including a stored or predetermined value, the satisfaction of that comparison can result in actions, functions, or operations controllable by the controller module. As used, the term "satisfies" or "satisfaction" of the comparison is used herein to mean that the first value satisfies the second value, such as being equal to or less than the second value, or being within the value range of the second value. It will be understood that such a determination may easily be altered to be satisfied by a positive/negative comparison or a true/false comparison. Example comparisons can include comparing a sensed or measured value to a threshold value or threshold value range.

The exemplary drawings are for purposes of illustration only and the dimensions, positions, order, and relative sizes reflected in the drawings attached hereto can vary.

Figure 1:
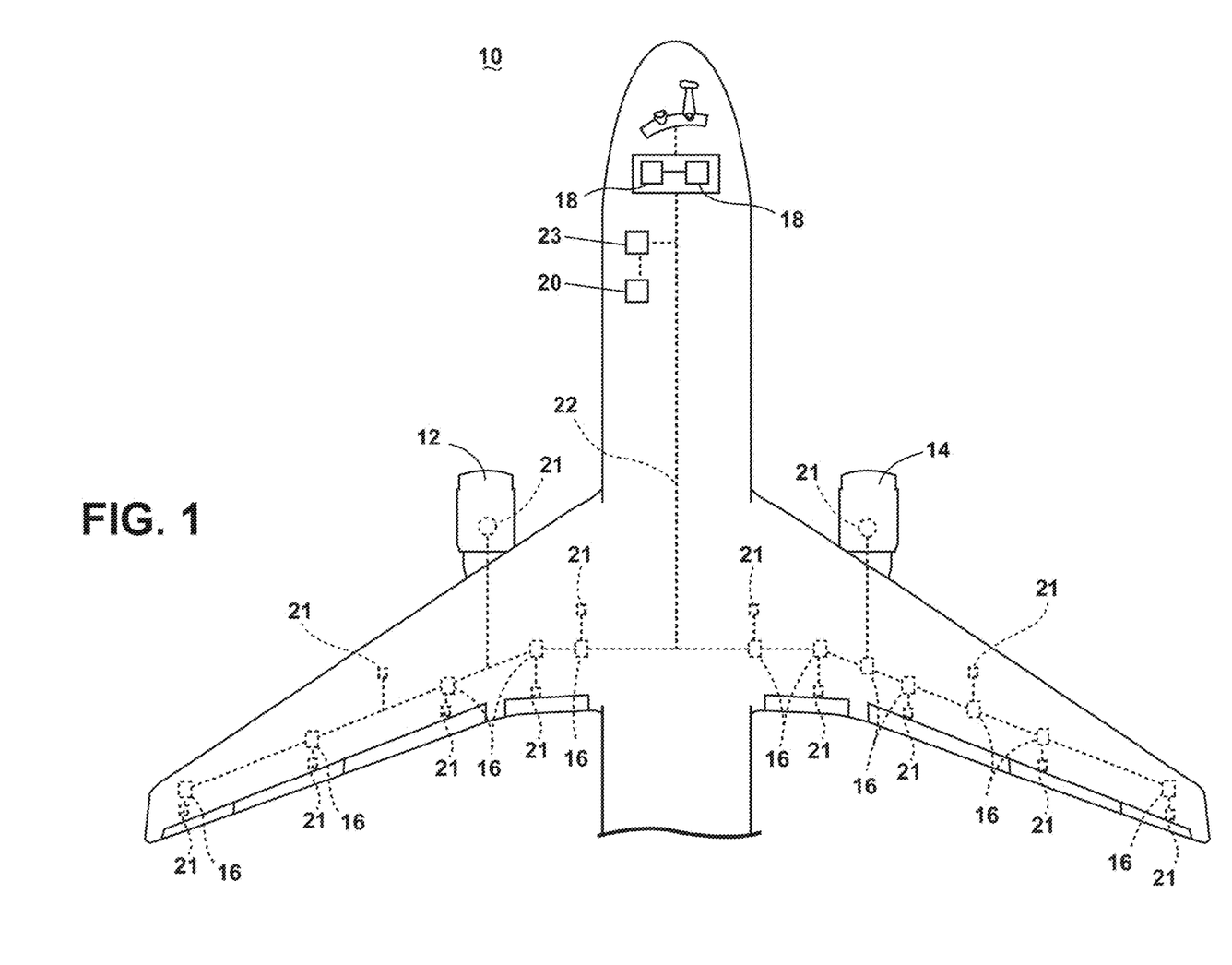
FIG. 1 is a top down schematic view of an example aircraft and avionics data network architecture of an aircraft, in accordance with various aspects described herein.

As illustrated in FIG. 1, an aircraft 10 can include at least one propulsion engine, shown as a left engine system 12 and right engine system 14. The aircraft 10 can further include one or more data sources, that is, components that create, originate, or otherwise generate data, and data destinations, that is, components that receive, consume, process, or otherwise act on or affect an outcome or operation based on data received. As shown, the aircraft 10 can include one or more avionics systems 18, including, but not limited to data storage or processing units, or functional systems such as the Flight Management System (FMS) or autopilot system, and a set of fixed aircraft components, such as Line-Replaceable Units (LRUs) 21, networking end nodes, or modular components of a vehicle or aircraft.

The aircraft 10 can include an AID 23. As used herein, the AID 23 can be defined as a device which can communicatively couple the electronic device 20 to one or more avionics systems 18. As used herein, "transmitting" data can include unidirectional data transmissions (e.g., to or from the avionics system 18) or bidirectional data transmissions. As illustrated, the AID can be communicatively coupled to the electronic device 20.

The electronic device 20 can include moveable, mobile, or otherwise removable devices that are adapted or configured to communicate with the aircraft 10, avionics system 18, LRUs 21, or the like, by way of a series of transmission pathways 22, network relays, or network switches 16 (collectively, a "network mesh"). In contrast, the avionics system 18 and the LRUs 21 can include stationary data sources. As used herein, "stationary" denotes that the avionics system 18 or LRU 21 can include devices that are generally fixed or incorporated into the aircraft 10 and would require significant work or maintenance services to remove from the aircraft 10, whereas "non-stationary" devices such as the electronic device 20 can include devices that can be moveable relative to the aircraft or data network, such as carried by one the flight crew from one location to another either on, or off the aircraft 10. Non-limiting examples of the electronic device 20 can include a handheld device such as a tablet, pager, portable computer, smart device, or the like, that can be carried onto the aircraft 10 by the flight crew. In contrast, a stationary avionics system 18 or LRU 21 can include, for example, a cockpit display, cockpit computer, or the like. In another example, the electronic device 20 can be stationary. It will be appreciated, that the electronic device 20 can be any suitable interface device such as, but not limited to, the EFB, an Air Traffic Controller (ATC), an Air Operations Center (AOC), or the like. It will be appreciated that the AID can be any device which could potentially pair to the avionics system of the aircraft 10. Although illustrated as a singular AID 23 and a singular electronic device 20, it will be appreciated that there can be any number of AIDs or electronic devices 20.

In the aircraft environment, the avionics system 18, or the electronic device 20, the transmission pathways 22, and the like, can be designed, configured, or adapted to operate according to a particular operation, interoperability, or form factor standards, such as those defined by ARINC series standards. In the exemplary aspects illustrated, the avionics system 18 can be positioned near the nose, cockpit, or pilot of the aircraft 10 and the electronic device 20 can be positioned near the nose, cockpit, or pilot of the aircraft 10, however, any relative arrangement can be included.

The avionics system 18 and the electronic device 20 can be configured to be communicatively coupled by way of the series of transmission pathways 22, network relays, or network switches 16. While network switches 16 are schematically illustrated, non-limiting aspects of the disclosure can be applied to peer-to-peer networks. The transmission pathways 22 can include a physical connection between the respective components, such as a wired connection including Ethernet, or can include wireless transmission connections, including, but not limited to, WiFi (e.g., 802.11 networks), Bluetooth, and the like. Collectively, the avionics system 18, electronic device 20, transmission pathways 22, and network switches 16 can form an avionics data network, or avionics-specific data network for the aircraft.

The aircraft 10, and the systems thereof, can be communicatively interconnected by way of the avionics-specific data network such has an ARINC-compatible data network. The avionics-specific data network can include, in one non-limiting example, an ARINC 429 (A429) compatible data network. It will be appreciated that the aircraft 10, and the systems thereof can be any avionics-specific data network compatible with any ARINC data network, including but not limited to an A664 data network, or any other known avionics-specific data network.

The electronic device 20 can include, for example, entirely contained systems, radios, or other auxiliary equipment to manage or operate aircraft functions. At least a set of avionics system 18 or electronic device 20 can, for example, generate data, which can be modified, computed, or processed prior to, or in preparation for packaging the data into data frames to be transmitted over the avionics data network by way of the transmission pathways 22 or network switches 16. At least another set of avionics system 18 or electronic device 20 can, for example, consume the data transmitted over the avionics data network. As such, the avionics data network can be defined as an aircraft communication system. In some instances, a single avionics system 18 or electronic device 20 can operate to both generate and consume data. As used herein, "consume," "consuming," or "consumption" of data will be understood to include, but is not limited to, performing or executing a computer program, routine, calculation, or process on at least a portion of the data, storing the data in memory, or otherwise making use of at least a portion of the data.

The illustrated aircraft 10 is merely one non-limiting example of an aircraft 10 that can be used in aspects of the disclosure described herein. Particularities of the illustrated aircraft 10 aspects, including relative size, length, number of engines, type of engines, and location of various components are not germane to the aspects of the disclosure, unless otherwise noted.

Figure 2:
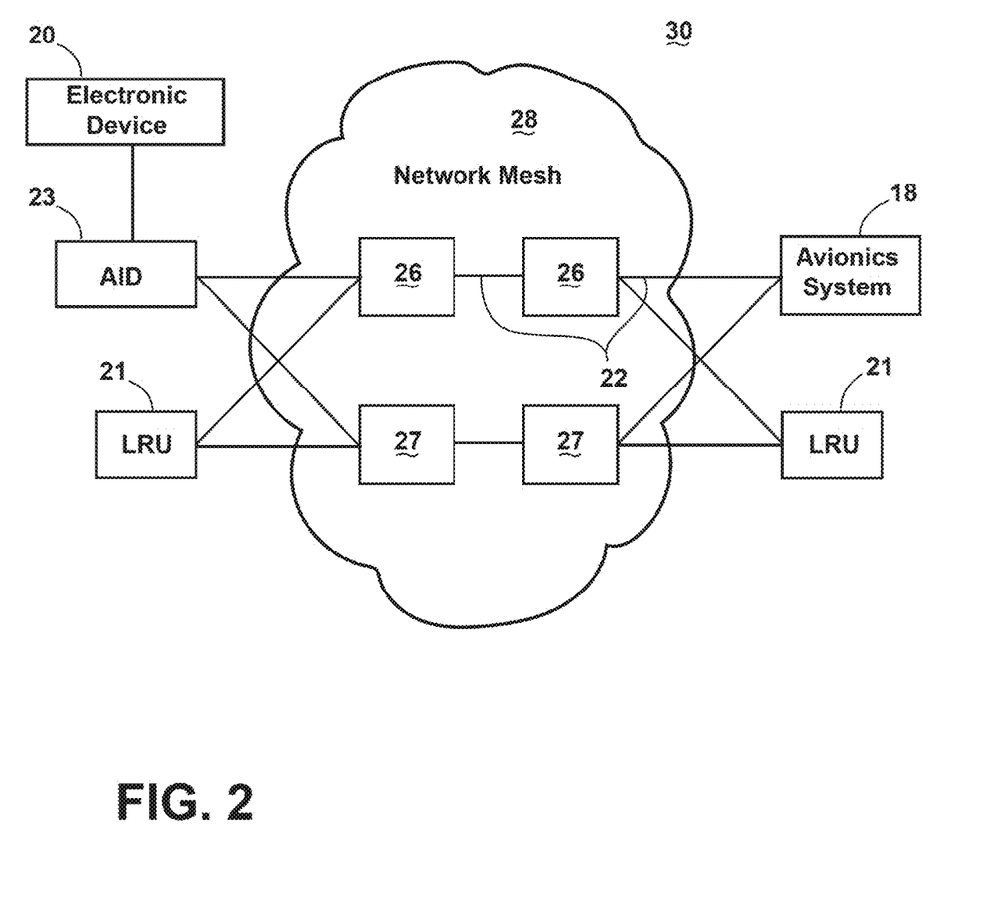
FIG. 2 is a schematic view of a specialized data network of the avionics data network of FIG. 1, in accordance with various aspects described herein.

FIG. 2 illustrates a non-limiting schematic view of a specialized data network 30 according to aspects of the disclosure. The specialized data network 30 can include various components, and perform the functions of the avionics data network outlined herein. The specialized data network 30 can include, but is not limited to, a set of redundant network switching units, such as a first set of switching units 26 defining a first path and a second set of switching units 27 defining a second, or redundant, path. The first and second switching units 26, 27 collectively define a network mesh 28 for routing the transmission of data frames between respective components, such as to and from the avionics system 18, and electronic device 20 via the transmission pathways 22 and the AID 23. As previously described, the transmission pathways 22 can include any communicative pathway, including but not limited to, wired or wireless communication connections. In one non-limiting example, the network mesh 28 is further shown having a set of transmission pathways 22 between the switching units 26, 27 to provide redundancy in transmission pathways 22. In one non-limiting example, the network mesh 28, the first set of switching units 26, the second set of switching units 27, or a combination thereof, can be arranged, configured, or otherwise enabled to utilize a specialized data network 30 transmission schema. The aspects of the disclosure illustrated in FIG. 2 is merely one representation of the specialized data network 30, and alternative configurations, organization, and component quantities, including, but not limited to, avionics system 18, including but not limited to the electronic device 20, LRUs 21, AIDs 23 or switching units 26, are envisioned.

Figure 3:
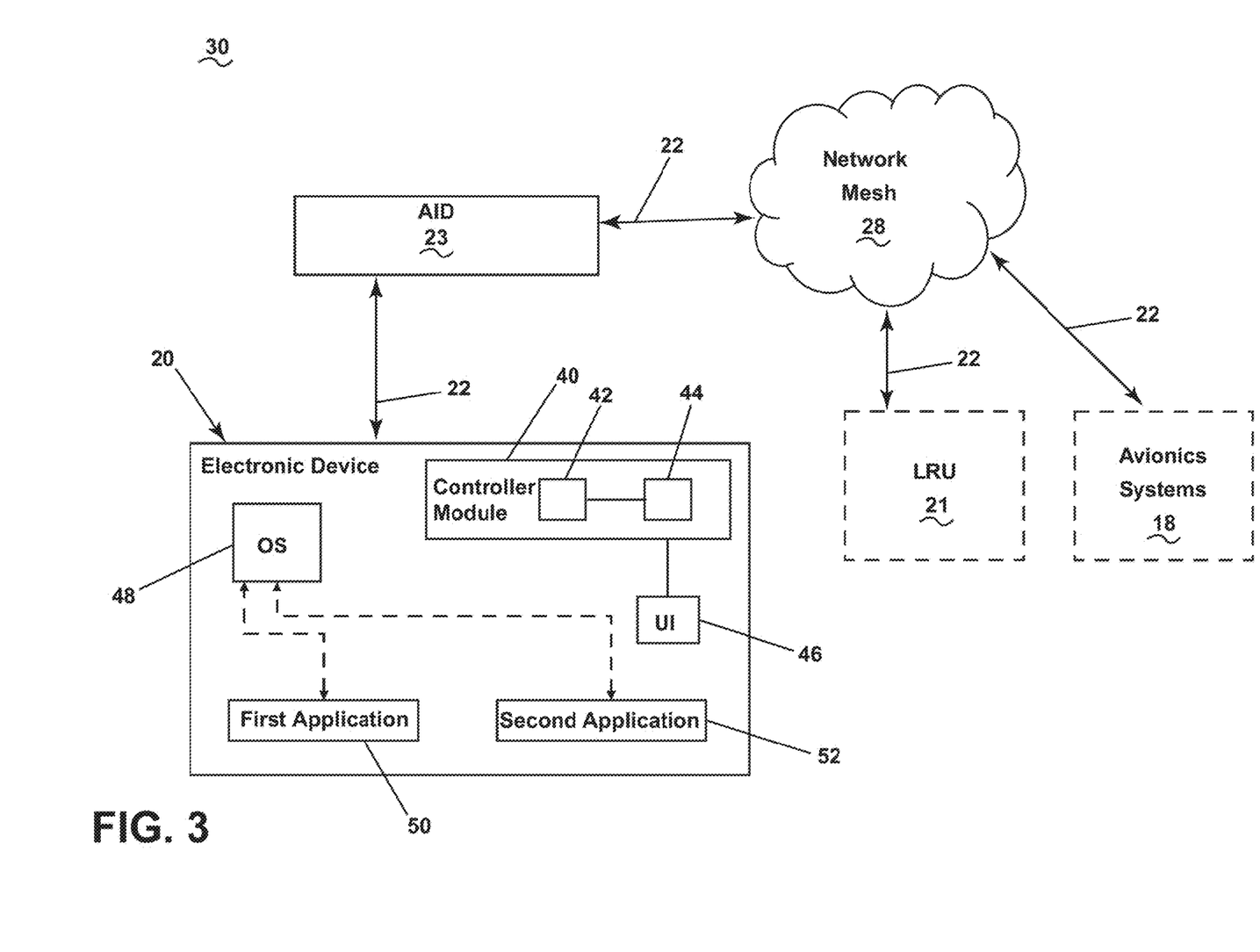
FIG. 3 is a schematic view of a specialized data network of FIG. 2 and an example electronic device and avionics system, in accordance with various aspects described herein.

FIG. 3 is a schematic view of the specialized data network 30 of FIG. 2 including the electronic device 20 which can execute or run a first application 50 and a second application 52. As used herein, the terms "execute" and "run" can be defined as the application which includes technical effects of performing a function or operating toward a functional output, as properly carried out or performed through the electronic device 20. Although illustrated to include the first application 50 and the second application 52, it will be appreciated that there can include any number of one or more applications.

The electronic device 20 can include a controller module 40 having a processor 42 and memory 44. The memory 44 can be defined as an internal storage for various aspects of the electronic device 20. For example, the memory 44 can store code, executable instructions, commands, instructions, authorization keys, specialized data keys, passwords, or the like. The memory 44 can be RAM, ROM, flash memory, or one or more different types of portable electronic memory, such as discs, DVDs, CD-ROMs, etc., or any suitable combination of these types of memory. The processor 42 can be defined as a portion of the controller module 40 which can receive an input, perform calculations, and output executable data. The processor 42 can be a microprocessor.

The electronic device 20 can include a User Interface (UI) 46. It is contemplated that the UI 46 can include a screen. However, the UI 46 can include any one or more of an indicator lights, a buzzer or any other known interface. The flight crew can alternatively use the UI 46 to receive user input. In this sense, the UI 46 can include a touch screen display or an input device, such as a keyboard, mouse, controller, joystick, or the like, to receive data or input commands. The UI 46 can additionally operate as an interface for interacting with the first application 50 or the second application 52. Non-limiting examples of the UI 46 can include Haptic Technology to receive an input directly from the flight crew or the pilot.

The electronic device 20 can include an OS 48 which can vary from one electronic device 20 to another. The OS 48 can be defined as any system which can host, run, or execute the first application 50 or the second application 52. The OS 48 can include any system for operation of the electronic device 20, such as a computer OS, a tablet OS, or the like.

The first application 50 and the second application 52 of the electronic device 20 can be defined as any suitable application which the flight crew or the pilot would use in the operation of the aircraft 10. For example, either one of or both of the first application 50 and the second application 52 can include any application such as, but not limited to, a Flight Management Application (FMA), an aircraft parts manual, Captain's reports, Captain's logs, service bulletins, aircraft maintenance reporting manuals, operations specifications, interactive plotting, aeronautical charts, flight logs, real time navigation, situational awareness aids, performance calculation applications, flight optimization applications, flight planning applications, processing applications, or the like. Further, the first application 50 and the second application 52 can perform a function or a subset of functions of the FMS. As such, functions of the FMS can be performed in the electronic device 20.

The first application 50 or the second application 52 can further utilize, interoperate with, make "calls" or system requests by way of, or be executed through at least a portion of a Software Development Kit (SDK) or more specifically, a Connected Flight Management System (CFMS) SDK. There can be any number of one or more applications executable through the CFMS SDK.

In operation, the first application 50 and the second application 52 can be run by way of the OS 48 of the electronic device 20. The electronic device 20 can then utilize transmission pathways 22 and the network mesh 28 to ultimately send and receive data from either one of or both of the avionics systems 18 or one or more LRU 21. The data sent to and received from the avionics system 18 or the one or more LRU 21 can be application-specific data. Additionally, the avionics system 18 and the one or more LRU 21 can be adapted to send information or data through the transmissions pathways 22 and the network mesh 28 to the electronic device 20. As a non-limiting example, both of the first application 50 or the second application 52 can run simultaneously or separately from one another. When both the first application 50 and the second application 52 run simultaneously, one of the two applications can have a limited functionality as defined by the OS 48. As used herein, the phrase limited functionality can be defined as the partial operation of one or more application. For example, an application in the background with limited functionality can be defined by the OS 48 to continue to monitor the avionics system 18 but not display the data from the avionics system 18.

The specialized data network 30 as described herein can be used to more easily pair one or more applications with the avionics system 18 when compared to conventional avionics pairing systems. As used herein, the term "pair", "pairing", or iterations thereof, can be defined as the establishment of a secured connection between an application and the avionics system 18. The establishment of a secured connection can be done by authenticating the application with the avionics system 18 through use of a specialized data key. The specialized data key can be defined as a combination of alphabetic, numerical symbols, encoded keys, encrypted keys, or a combination thereof. The specialized data key can be used to enable, authorize, or otherwise authenticate pairing between the avionics system 18 and the electronic device 20, or the first application 50 and the second application 52 by identifying the electronic device 20 and its first or second applications 50, 52. The specialized data key can be a public or private key for symmetric or asymmetric encryption. The specialized data key can further be more than one specialized data key. For example, the avionics system 18 can require that two specialized data keys be used for authentication. It will be appreciated that the methods described herein can be applied to any number of specialized data key The specialized data network 30 does not require that each application be paired individually with the avionics system 18 every time a new application is opened. As such, the specialized data network 30 ensures that each individual pairing does not require that a new or separate specialized data key is generated every time a new application is opened. With the implementation of the specialized data network 30, only the first application 50, or the first application to be opened needs to be manually paired with the avionics system 18. Further, the specialized data network 30 allows for the storage of the specialized data key within the OS 48. Subsequently opened applications can query the OS 48 for the specialized data key and ultimately obtain the specialized key from the OS 48 or memory accessible to the OS 48. As such, the OS 48 can send the specialized data key which has already been stored within the OS 48 to the subsequently opened application without the need of generating a new specialized data key. This eliminates the need for subsequent applications to be paired applications to pair or be authenticated with the avionics system 18.

Although not illustrated, it is contemplated that the AID 23 can include components similar to those of the electronic device 20 as described herein. can include an AID controller module (not shown) which can perform similar functions as the controller module 40. The AID controller module can include an AID memory (not shown) similar to memory 44, and an AID processor (not shown) similar to processor 42. It is contemplated that the AID 23 can further include an AID UI (not shown) similar to the UI 46, and an AID OS (not shown) similar to the OS 48 as described herein. The AID 23 can further be configured to run or execute one or more applications. As such, the electronic device 20 can be the AID 23. It will be appreciated that the methods described herein can be applied to any electronic device 20 including the electronic device 20 or the AID 23. It is further contemplated that the electronic device 20 can communicate with the avionics system 18 without use of the AID 23.

Figure 4:
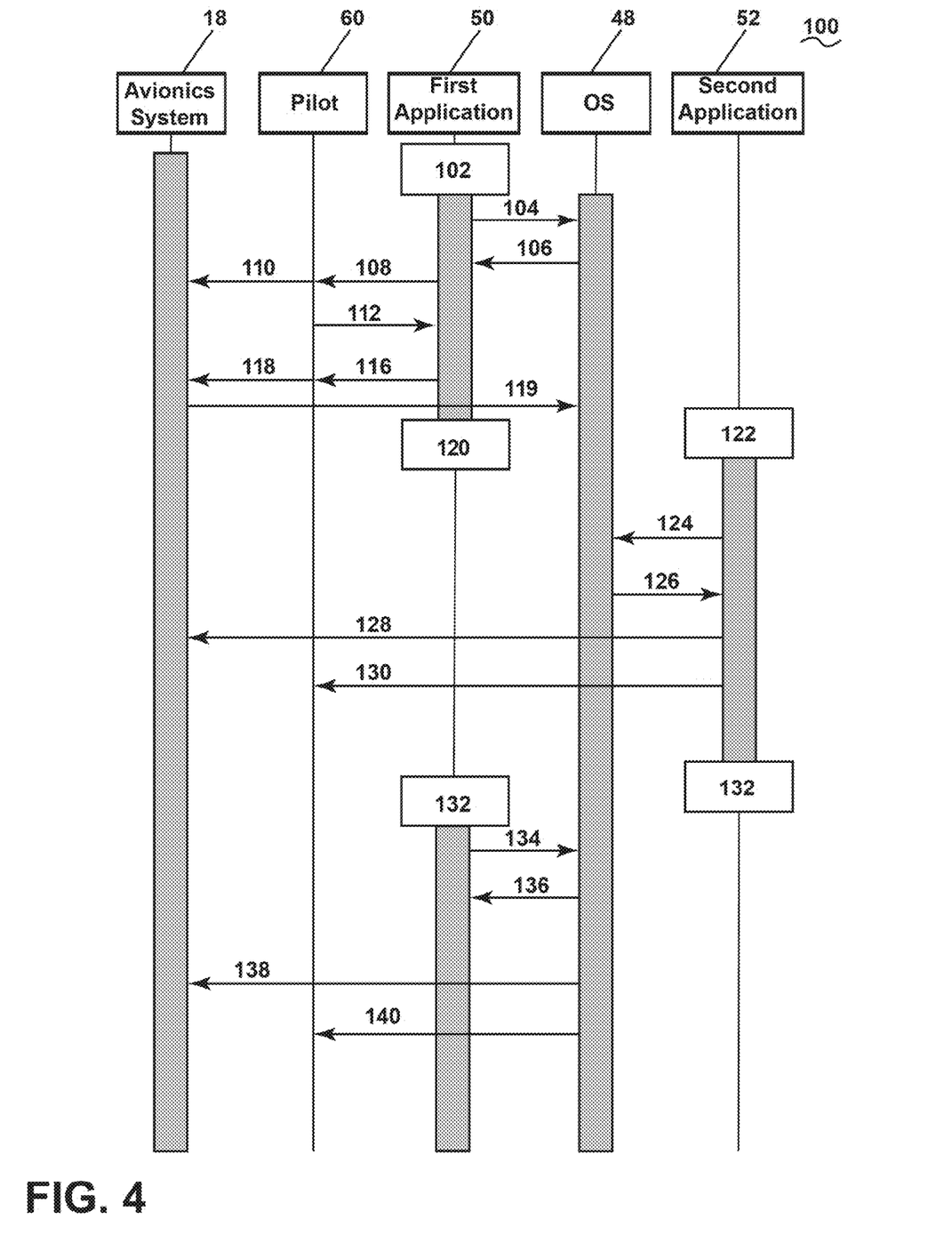
FIG. 4 is a flow chart diagram of a method of connecting a first application and a second application to an avionics system of FIG. 3, in accordance with various aspects described herein.

FIG. 4 is an example flowchart 100 of a method for pairing the first application 50 and the second application 52 with an avionics system 18 of FIG. 3 in accordance with aspects of the disclosure. The pairing can be initiated through a pilot 60. Although illustrated as pilot 60, it will be appreciated that this method can be initiated through any one or more of the flight crew.

The pilot 60 can utilize or interact with the first application 50, for example, by way of the UI 46 (not shown) to interact with the avionics system 18, such as an FMS, at step 102. As explained herein, in order to enable the electronic device 20 to receive data from, exchange data with, or otherwise communicate with the avionics system 18, the utilized application (e.g., the first application 50 or the second application 52) must be authenticated with the avionics system 18. This authentication can be done through use of a specialized data key as described herein.

For example, the first application can generate a system or OS-based request to interact with the avionics system 18, which in turn can generate a request or query to try to acquire a specialized or authentication key from the OS 48, at 104. In one non-limiting example, the generated request can include an application, OS-based, system call, or socket-type request, delivered to the OS 48. As used herein, the socket can be defined as any two-way communication link between the corresponding application and the aircraft 10 or avionics system 18 within the specialized data network 30.

The OS 48, in some instances, can indicate to the first application 50 that the specialized data key is either unavailable or not yet received by way of initialization or pairing with the avionics system 18, at step 106. In another non-limiting example, a previous specialized data key may have expired, is no longer trusted or invalid, and is thus "unavailable" in the sense that it is no longer a valid key. If the specialized data key is unavailable, the first application can notify the pilot 60 through UI 46 that the specialized data key is unavailable, at step 108. The pilot 60 can then initiate, start, or otherwise enable a pairing process with the avionics system 18, at step 110, to generate or otherwise receive a valid specialized data key. In one non-limiting example of the pairing process, the first application 50 can display the specialized data key to the pilot 60, for example, by way of the UI 46, at step 116, who then inputs the specialized data key to the avionics system 18, at 118. The avionics system 18 can then, in response to receiving the specialized key, provide the specialized data key to the OS 48 to be stored, at 119. The specialized data key can be generated directly by the SDK of the first application 50. Alternatively, the specialized data key can be generated by another portion for the application or through a component outside of the SDK or first application 50. For example, the electronic device 20 can include a dedicated specialized data key generator for generating specialized keys. This specialized data key generator can be configured to receive requests to generate a specialized data key, generate the specialized data key, and subsequently send the specialized data key to where it is needed.

With the specialized data key stored in the OS 48, the first application 50 can then operate authorized or authenticated exchanges of data or data transmissions with the avionics system 18 by way of the specialized data key stored and recalled from the OS 48. In another non-limiting example, if the first application 50 requests or initiates a desired exchange of data with the avionics system 18, and a valid specialized data key is already stored at the OS 48, the OS 48 can provide the valid specialized data key to the first application 50 without initiating a pairing process.

The pilot 60 can then stop utilizing or interacting with the first application 50 at step 120. Subsequently, the second application 52 can be utilized or interacted with at step 122. The second application 52 can then generate the system or OS-based request to interact with the avionics system 18, which in turn can generate a request to try to acquire or query the specialized data key from the OS 48, at step 124. As the specialized data key has already been stored in memory accessible to the OS 48 (step 119), the OS 48 can obtain the specialized data key from memory and send the specialized data key to the second application 52, at step 126. As used herein, the statement that the OS 48 can send the specialized data key to the applications can be defined as the OS 48 sending a command to the location where the specialized data key is stored to send the specialized data key to the desired destination (in this case the second application 52). The specialized data key can be stored within memory accessible to the OS 48, in a Trusted Processing Module (TPM), or the like. The TPM can be any trusted or secure device or component of the specialized data network 30 which contains memory and can be communicatively coupled with the electronic device 20. The second application 52 can then validate the specialized data key with the avionics system 18 at step 128. As used herein, "validate" or iterations thereof can be defined as an authentication of a transmission or part of the transmission. For example, the validation or authentication of the specialized data key which was stored within the OS 48. Ultimately, the pilot 60 can be notified of the paired status at step 130.

The pilot 60 can subsequently suspend utilization or interaction with the second application 52 at step 132. The pilot can then start utilizing or interacting with the first application 50 at step 132. The first application 50 can once again generate the system or OS-based request to interact with the avionics system 18, which in turn can generate a request to try to acquire or query the specialized data key from the OS 48, at step 134. The OS 48 can then send the specialized data key from memory and send the specialized data key to the first application 50, at step 136. The first application 50 can then validate the specialized data key with the avionics system 18 at step 138 and subsequently notify the pilot 60 of the paired status at step 140.

In one non-limiting example, the OS 48, not each respective application 50, 52 can be configured, adapted, or otherwise enabled to request the specialized data key from the avionics system 18, receive the specialized data key from the avionics system 18, store the specialized data key from the avionics system 18. In this sense, each respective application 50, 52 does not request, receive, store, or the like, the specialized data key, but rather through the CFMS SDK or SDK interacts with the specialized data key stored in or at, and managed by way of, the OS 48. It will be appreciated that any avionics system 18 or component of the electronic device 20 can request, receive, or store the specialized data key.

Figure 5:
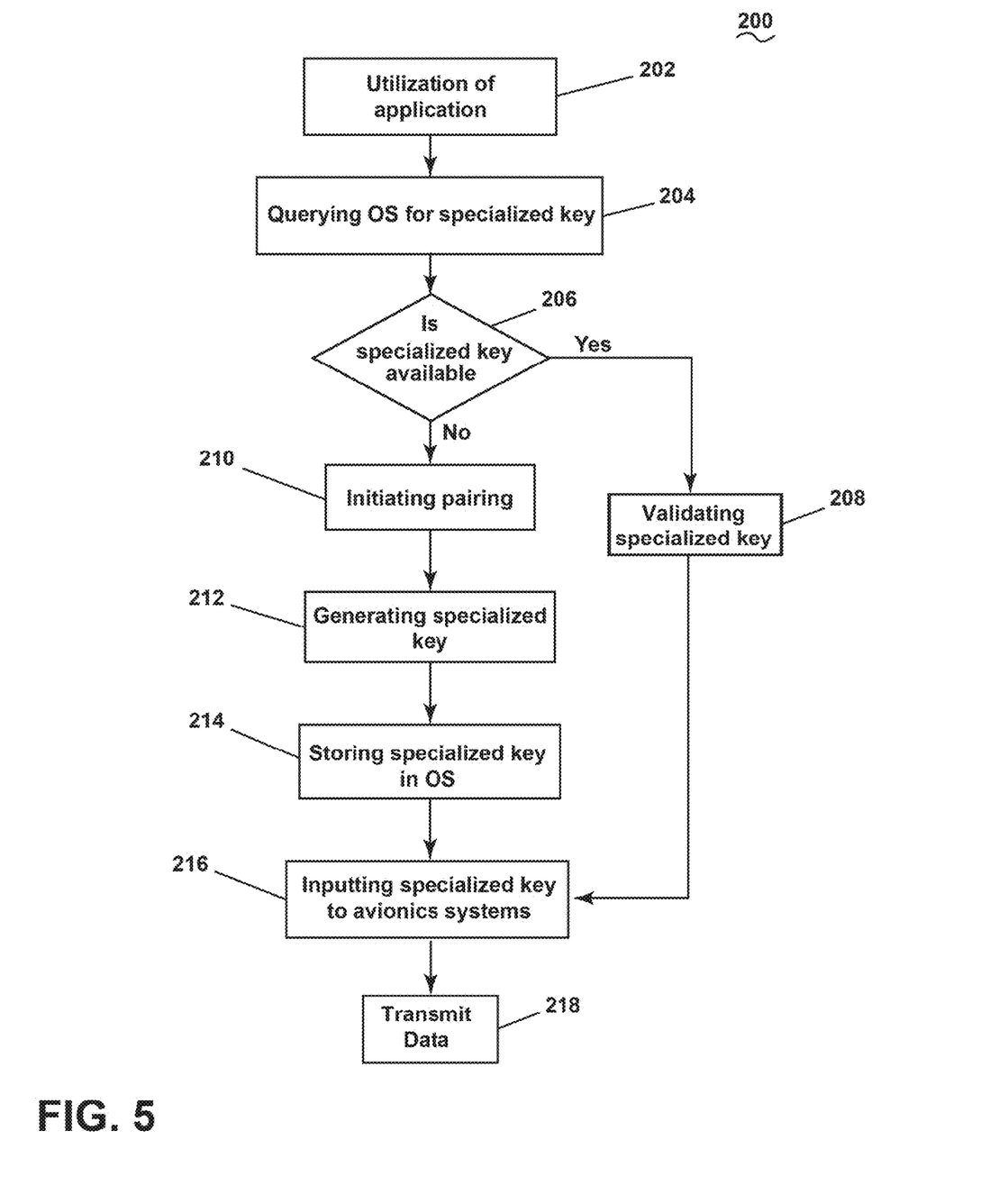
FIG. 5 is a method of connecting an application to the avionics system of FIG. 3, in accordance with various aspects described herein.

FIG. 5 is an example method 200 of pairing a singular application with an avionics system 18 through the specialized data network 30 of FIG. 2 in accordance with aspects of this disclosure.

The method 200 can begin with the utilization of or interaction with the application at step 202. The utilization of or interaction with the application can be done through the pilot 60, the flight crew or other methods. Other methods can include, but are not limited to, a periodic schedule of the electronic device 20 to run the application at a defined interval. For example, the electronic device 20 can be programmed to run or at least partially run one or more application every time a time interval has elapsed. The time interval can be any predefined amount of time. For example, some applications can be configured to at least partially run and periodically wake-up (fully run) to execute a predefined function of the application (e.g., obtain sensor readings, send out requests to the avionics systems 18, display a chart, or the like).

The application can then generate the system or OS-based request to interact with the avionics system 18, which in turn can generate a request or query to try to acquire the specialized data key from the OS 48, at step 204. If the specialized data key is already available (e.g., stored within the OS 48) at step 206, the method 200 can proceed to validating the specialized data key with the avionics system 18 at step 208. If the validating the specialized data key confirms the specialized data key is valid, the method 200 can continue to input the specialized data key to the avionics system 18 at step 216. Ultimately, the application can then exchange data with the avionics system 18 at step 218. As used herein, the phrase exchange data can mean any communication to and from the electronic device 20 from the application to the avionics system 18. The transmission of data can occur once the application is authenticated and effectively paired with the avionics system 18.

If the specialized data key is not available to the application at step 208, the method 200 can proceed to initiating pairing, at step 210. The generating of the specialized data key by the application can then occur at step 212. Once the specialized data key is generated, it can be stored within the OS 48, at step 214. The application can then input the key either directly or indirectly (e.g., the application sends the specialized data key to the UI 46 of the electronic device 20 where it will first be displayed to the pilot 60 or flight crew) to the avionics system 18, at step 216. Ultimately, the application can then exchange data with the avionics system 18 at step 218.

Figure 6:
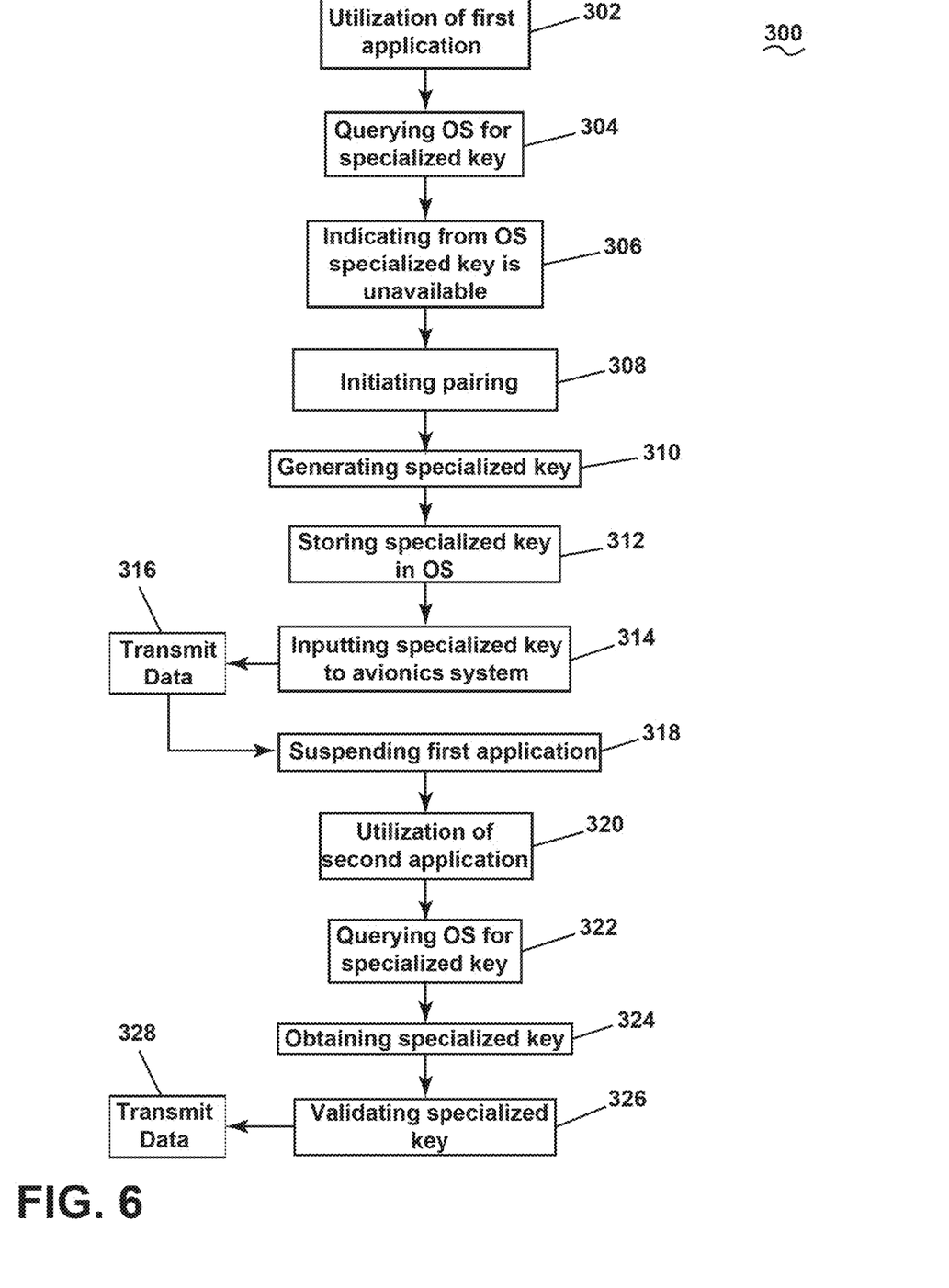
FIG. 6 is a method of connecting the first and the second application to the avionics system of FIG. 3, in accordance with various aspects described herein.

FIG. 6 is an example method 300 of pairing multiple applications with an avionics system 18 through the specialized data network 30 of FIG. 2 in accordance with aspects of this disclosure.

The method 300 can begin with the utilization of or the interaction with the first application 50, at step 302. The first application 50 can then generate the system or OS-based request to interact with the avionics system 18, which in turn can generate a request or query to try to acquire the specialized data key from the OS 48, at step 304. The OS 48 can then provide a response transmission to the first application 50 to indicate whether the specialized data key is available, at step 306 (in this case, the specialized data key is not available). As such, the first application 50 or the pilot 60 or other flight crew can then initiate pairing with the avionics system 18, at step 308. The first application 50 can then generate the specialized data key, at step 310. Once the specialized data key is generated, it can be stored within the OS 48, at step 312. The first application 50 can then input the key either directly or indirectly to the avionics system 18, at step 314. Ultimately, the first application 50 can exchange data with the avionics system 18, at step 316.

Upon suspension of utilization or interaction with the first application 50, at step 318, the second application 52 can be utilized or interacted with by any of the methods described herein, at step 320. The second application 52 can then generate the system or OS-based request to interact with the avionics system 18, which in turn can generate a request or query to try to acquire the specialized data key from the OS 48, at step 322 As the specialized data key is already stored within memory and accessible to the OS 48 (step 312), the second application 52 can obtain the specialized data key from the OS 48 directly, at step 324. The second application 52 can then proceed with validating the specialized data key at step 326. Ultimately, the application can then exchange data with the avionics system 18 at step 328.

The sequences depicted are for illustrative purposes only and are not meant to limit the flowchart 100 or methods 200, 300 in any way, as it is understood that the portions of the method can proceed in a different logical order, additional or intervening portions can be included, or described portions of the method can be divided into multiple portions, or described portions of the method can be omitted without detracting from the described method. For example, steps such as validating of the specialized data key can be omitted or a step to notify the pilot or the flight crew of a non-paired status of the applications can be added. It will be appreciated that many variations exist.

The SDK establishes and maintains the secure connection with the avionics system. This secure connection is established through the first application that uses the SDK. This secure connection can be shared with any subsequent application once it launches and "proves" to the SDK that it is an authenticated application (e.g., via a certificate).

Once a specialized data key has been acquired either through pairing manually or from the OS 48, the SDK will continue to monitor the status of the pairing and a session ID from the avionics system 18. In the case that the pairing is lost or terminated and the electronic device 20 and the avionics system 18 are no longer synchronized, the SDK can try to reacquire the specialized data key from the OS 48. If the specialized data key is invalid and synchronization cannot occur, the SDK can indicate via a callback to reinitiate the pairing.

The callback can be internally initiated by the SDK. The SDK can utilize code (e.g., C++, Obj-C, or the like) directly to leverage the callback.

The methods 100-300 described are advantageous to use over conventional pairing systems for a few main reasons. Through use of the pairing methods described in the flowchart 100 or methods 200, 300 the time required to pair each subsequent application after the initial pairing of the first application can be greatly reduced. The system described herein ensures that the pilot or the flight crew does not need to burden themselves with pairing each of the applications in the electronic device every time a new application is opened. Instead, it ensures that they only need to pair or authenticate each electronic device with avionics system once. Conventional systems can require that each application write a specialized data key unique to the application. The specialized data key cannot be shared between applications. As such, the flight crew must go through all steps of pairing (initiating of pairing, enabling of pairing, generating of specialized data key, etc.) each time a new application is utilized or interacted with. This can be very time consuming. The current system allows for the specialized data key to be stored within the OS 48 and shared between applications. As such, only the initially opened application (e.g., the first application) needs to go through the pairing process by generating and authenticating the specialized data key. Subsequently opened applications (e.g., the second application) can establish a connection through use of the SDK and already generated specialized data key. The complexity of establishing a secure connection through pairing for each individual application is thereby eliminated. Instead, each electronic device only needs to establish a secure connection once for any subsequently opened application to pair with the avionics system.

Further yet, the methods described herein can allow for collaboration between applications developed by third party developers. A single session can be shared by disparate applications using the same specialized data key. The developers only need to call upon the startup function (e.g., SDK.InitiatePairing( )) to initialize the SDK, which will then proceed to query the OS to ascertain the existence and validity of the specialized data key. The developers only need the application to interoperate with the SDK to interact with the OS of the electronic device. The incorporation of the SDK allows for collaboration between developers of the applications to permit concurrent use of one application produced by Company X and another application produced by Company Y. Both applications can interoperate with the SDK and be able to run concurrently in the electronic device. The SDK can manage the sharing of the connection which in turn can allow for concurrent use of a single specialized data key between applications on a common electronic device. This sharing of the connection is non-dependent on the developer of the application or the OS thereby eliminating the need for collaboration between developers. As such, the SDK is non-dependent on the OS.

It is further contemplated that the methods as described herein can allow for the transmission of periodic data from the avionics system to be received by the one or more applications of the electronic device without having to first pair with the one or more avionics system. As used herein, periodic data can be defined as data that is sent from the one or more avionics system during a predetermined time slot. The periodic data from the one or more avionics systems can be received and processed by the one or more applications regardless of the running or paired status of each of the one or more applications. For example, the avionics system can be the FMS which may periodically transmit data (e.g., position, speed, heading, etc.) through the specialized data network and to the electronic device. The SDK can be configured to allow for the one or more applications to listen for and receive periodic data or transmissions from the FMS without pairing with the FMS. Although it is described in terms of the FMS, it is contemplated that the avionics system can be any avionics system as described herein which may periodically transmit data to the electronic device.

Additional or alternative aspects of the disclosure can be included, by which at least one of the OS, applications, avionics system (etc.) can regulate the authentication or authenticated access of the respective one or more applications of the electronic device with the avionics system, by way of the SDK, specialized data key, or the like. For example, the OS can include various libraries or lists within memory which can include applications that are allowed or are not allowed to obtain authentication with the avionics system. The SDK can request the libraries form the OS to determine which applications have the appropriate permissions to obtain authentication with the avionics system and which do not. Alternatively, or additionally, the avionics system, the SDK, or the specialized data key can include or obtain these libraries or lists to determine which applications can proceed with authentication with the avionics system or which cannot. Stated another way, aspects of the disclosure can be included which ultimately enable or allow for authorized access or communication with the avionics system, as described herein, on a per-application-basis, on the electronic device.

To the extent not already described, the different features and structures of the various aspects can be used in combination with each other as desired. That one feature cannot be illustrated in all of the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

This written description uses examples to disclose aspects of the disclosure, including the best mode, and also to enable any person skilled in the art to practice aspects of the disclosure, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects of the invention are provided by the subject matter of the following clauses:

An electronic device for an aircraft, the electronic device comprising, a memory associated with an operating system (OS), specialized data key stored within the memory, and at least one application at least partially operable by way of the electronic device and operable in response to a request for data transmission wherein the at least one application is configured utilize the specialized data key for establishing a connection with at least one avionics system of the aircraft and for receiving data from the at least one avionics system.

The electronic device of any preceding clause, wherein the at least one avionics system is a Flight Management System (FMS).

The electronic device of any preceding clause, wherein the at least one application comprises a first application and a second application.

The electronic device of any preceding clause, wherein the first application and the second application can be run simultaneously.

The electronic device of any preceding clause, wherein both the first application and the second application can receive data from at least one avionics system by way of the same specialized data key.

The electronic device of any preceding clause, wherein the at least one application can interoperate with at least a portion of a Software Development Kit (SDK) to access the specialized data key.

The electronic device of any preceding clause, wherein the SDK is non-dependent on the OS.

The electronic device of any preceding clause, wherein the electronic device is an Electronic Flight Bag (EFB).

An aircraft communication system comprising an electronic device having memory associated with an Operating System (OS) and at least one application, and at least one avionics system of the aircraft, configured receive data from the at least one application in response to authorizing the at least one application by way of a specialized data key wherein the specialized data key is stored in the memory associated with the OS, and wherein each of the at least one application is configured to request and receive the specialized data key from OS, enabling each of the at least one application to receive data from the at least one avionics system.

The aircraft communication system of any preceding clause, wherein the at least one avionics system is a Flight Management System (FMS).

The aircraft communication system of any preceding clause, wherein the electronic device is an Electronic Flight Bag (EFB).

The aircraft communication system of any preceding clause, wherein the at least one application comprises a first application and a second application.

The aircraft communication system of any preceding clause, wherein the first application and the second application can be run simultaneously.

The aircraft communication system of any preceding clause, wherein the first application and the second application can establish an authorized connection with the at least one avionics system by way of the specialized data key.

The electronic device of any preceding clause, wherein the at least one application can be interoperable with at least a portion of a Software Development Kit (SDK) to access the specialized data key.

A method of authorizing an application of an electronic device to communicate with at least one avionics system, the method comprising initiating an authorization process between the electronic device and the one or more avionics system, receiving, in the electronic device, a specialized data key authorizing the receiving of data from the at least one avionics system, storing the specialized data key in memory associated with an operating system (OS), requesting, by the application of the electronic device, the specialized data key from the systems, and in response to being authorized by the avionics system, receiving data in the authorized application from the at least one avionics system.

The method of any preceding clause, further comprising generating, by a second application, one of a system or an Operating System (OS)-based request to interact with the at least one avionics system, and in response to generating the request to interact with the at least one avionics system, generating a request to acquire the specialized data key from the OS.

The method of any preceding clause, further comprising communicating, by the OS, the specialized data key to the second application.

The method of any preceding clause, further comprising validating, by the OS, the specialized data key prior to sending the specialized data key to the second application.

The method of any preceding clause, further comprising, in response to establishing connection by way of the specialized data key between the second application and the at least one avionics system, receiving data from the at least one avionics system and the second application.

What is claimed:

1. An electronic device communicatively coupled to an avionics system of an aircraft, the electronic device comprising:
   a memory associated with an operating system (OS);
   a specialized data key stored within the memory;
   at least one application at least partially operable by way of the electronic device and operable in response to a request for data transmission;
   at least a second application partially operable by way of the electronic device and operable in response to a request for data transmission; and
   wherein the electronic device is configured to:
      request, via a first application of the at least one application, the specialized data key from the avionics system;
      retrieve, via the second application, the specialized data key from the OS;
      receive, from the avionics system and at the memory associated with the OS, the specialized data key; and
      utilize the specialized data key to establish a connection with the avionics system and the at least one application for receiving data from the avionics system.

2. The electronic device of claim 1, wherein the avionics system is a Flight Management System (FMS).

3. The electronic device of claim 1, wherein the at least one application comprises a first application and a second application.

4. The electronic device of claim 3, wherein the first application and the second application are run simultaneously.

5. The electronic device of claim 3, wherein both the first application and the second application receives data from the avionics system by way of the same specialized data key.

6. The electronic device of claim 1, wherein the at least one application interoperates with at least a portion of a Software Development Kit (SDK) to access the specialized data key.

7. The electronic device of claim 6, wherein the SDK is non-dependent on the OS.

8. The electronic device of claim 1, wherein the electronic device is an Electronic Flight Bag (EFB).

9. An aircraft communication system comprising:
   an electronic device having memory associated with an Operating System (OS) and at least one application including at least a first application and at least a second application; and
   at least one avionics system including a specialized data key, the at least one avionics system being configured to receive data from the first application and the second application by way of the specialized data key;
   wherein the electronic device is configured to:
      request, via the first application of the at least one application, the specialized data key from the at least one avionics system;
      retrieve, via the second application, the specialized data key from the OS;
      receive, from the at least one avionics system and the memory associated with the OS, the specialized data key; and
      request and receive, via the at least one application, the specialized data key from the OS, enabling each application of the at least one application to receive data from the at least one avionics system.

10. The aircraft communication system of claim 9, wherein the at least one avionics system is a Flight Management System (FMS).

11. The aircraft communication system of claim 9, wherein the electronic device is an Electronic Flight Bag (EFB).

12. The aircraft communication system of claim 9, wherein the first application and the second application are run simultaneously.

13. The aircraft communication system of claim 9, wherein the first application and the second application establishes an authorized connection with the at least one avionics system by way of the specialized data key.

14. The electronic device of claim 9, wherein the at least one application is interoperable with at least a portion of a Software Development Kit (SDK) to access the specialized data key.

15. A method of authorizing an application of an electronic device to communicate with at least one avionics system, the method comprising;
   initiating an authorization process between the electronic device and the at least one avionics system;
   receiving, in the electronic device, a specialized data key authorizing a receiving of data from the at least one avionics system;
   storing the specialized data key in memory associated with an operating system (OS);
   requesting, by the application of the electronic device, the specialized data key from the systems;
   in response to being authorized by the avionics system, receiving data in the authorized application from the at least one avionics system;
   generating, by a second application, one of a system or an Operating System (OS)-based request to interact with the at least one avionics system;
   and in response to generating the request to interact with the at least one avionics system, generating a request to acquire the specialized data key from the OS.

16. The method of claim 15, further comprising communicating, by the OS, the specialized data key to the second application.

17. The method of claim 16, further comprising validating, by the OS, the specialized data key prior to sending the specialized data key to the second application.

18. The method of claim 17, further comprising, in response to establishing connection by way of the specialized data key between the second application and the at least one avionics system, receiving data from the at least one avionics system and the second application.

* * * * *